Nov. 17, 1959  W. E. SEHN  2,912,727
WEATHER SEALING MEMBER
Filed Sept. 24, 1956

INVENTOR
William E. Sehn
BY
W. C. Middleton
ATTORNEY 2,912,727

WEATHER SEALING MEMBER

William E. Sehn, Highland Park, Mich., assignor to General Motors Corporation, Detroit, Mich., a corporation of Delaware Application September 24, 1956, Serial No. 611,447

5 Claims. (Cl. 20—69)

This invention relates to weather sealing members for closures and particularly to weather sealing members for vehicle bodies.

With the advent of four-door hardtop bodies, a problem arose in effecting a suitable seal between the windows of the front and rear doors especially since the center post between the windows was eliminated. Furthermore, such a seal must be adapted to permit opening and closing of both doors together or separately as well as to allow opening and closing of the windows also together or separately. Of course, with both windows fully opened, the space between the windows must be void of any structure.

The present invention contemplates, with these problems in mind, the provision of a weather sealing member which functions as an effective seal while still meeting the door and window opening and closing requirements.

Further, the novel configuration of the sealing member provides additional insurance against leakage and re-adjusts easily to misalignments of adjacent structures. Specifically, the sealing member has flexible arcuate arms or lips, each of which abuts an adjacent surface of one of the window frames. A trough is formed between the lips available to carry away any water that might leak through the outside lip of the weather strip.

The foregoing and other objects and advantages of the invention will be apparent from the following description and accompanying drawings, in which.

Figure 1:
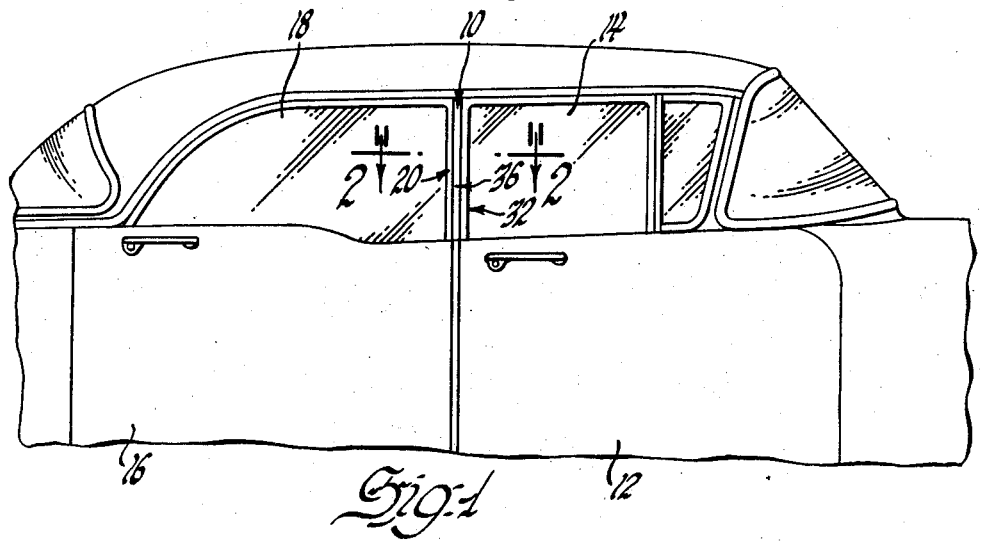
Figure 1 is a view of a vehicle body with which the invention is used.
Figure 2:
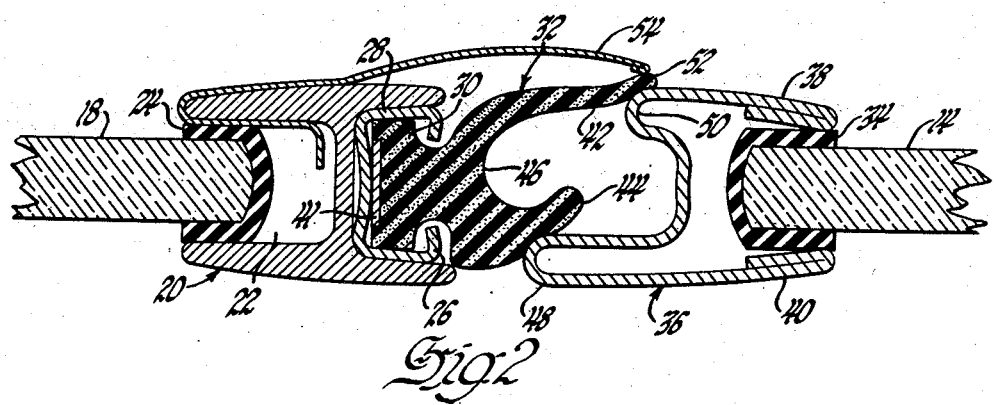
Figure 2 is an enlarged sectional view on line 2—2 of Figure 1.

In Figure 2 an embodiment of the invention designated generally at 10 is shown applied to a vehicle body of the four-door hardtop type. A front door 12 includes a window glass 14 and an adjacent rear door 16 includes a window glass 18, the opening and closing movement of these doors and windows being accomplished in a well-known manner.

As depicted by Figure 2, the details of the related structures which are represented by the numeral 10 are shown in the closed position for both the windows and the doors. An H-shaped forward upright window frame member 20 clampingly receives in a rear channel 22 a U-shaped flexible member 24 which embraces the rear window glass 18. A forward channel 26 in the frame member 20 snugly embraces a clamping ring 28 which attaches to a base portion 30 of a weather sealing member or strip 32. As with the rear window glass, the front window glass 14 also has associated therewith a U-shaped flexible member 34 which embraces the peripheral edge of the window glass 14. An H-shaped rear upright window frame member 36 clampingly engages, between legs 38 and 40, the member 34 and the window glass 14. The frame members 20 and 36 move with their respective windows up and down to provide an open and a closed position for each of the windows. Hence, with both of these frame members in the down or open position, the space between the windows is open and completely void of structure such as a supporting post. During this opening movement of the frame member 20, the sealing member 32 will of course move with the frame member because of the aforementioned clamping ring 28 and its engagement with the sealing member 32.

The sealing member or weather strip 32 is made of some flexible material which is readily formable and adaptable to production of large quantities, e.g., rubber. To induce rigidity and to stiffen the flexible material, either a stiffener strip 41 is inset in the material, as illustrated, or the base portion 30 is made of relatively hard mechanical rubber material. This sealing member 32 includes arcuate arms or projecting lips 42 and 44 longitudinally extending from the base portion 30 to form therebetween a trough 46. The outside or outboard arm 44 (outside as viewed from the exterior of the car) is shorter in length and thicker in width than the inside or inboard arm 42, the purpose being to insure against excessive misalignments and to give a more positive seal at the outboard side. The inside arm 42 should preferably be of a narrow width to facilitate lateral bending of this arm. The frame member 36 is formed to provide an outside or outboard flange 48 and an inside or inboard flange 50 both extending longitudinally rearwardly with the flange 48 being of substantially longer length than the inside flange 50. With these lengths the outside and thicker arcuate arm 44 will engage the outside flange 48 and the inside arm 42 will engage the inside flange 50 both in sealing relation. If leakage should occur in the abutting area between the arm 44 and the outside flange 48, the trough 46 can act as a means for carrying away this leakage fluid. Also, with this double arm construction, if leakage occurs between the arm 44 and the flange 48, there still remains a seal between a terminal end 52 of the arm 42 with the flange 50.

It should be noted that the arm 42 of the sealing member 32 in the vicinity of the terminal end 52 is normally biased inboard, when unstressed, to ensure that this end moves past the inboard flange 50 of the frame member 36 without catching and hanging up on the outboard side of the flange. This is especially important when the rear door 16 is being closed with the front door 12 already closed.

To conceal the weather strip 32 from view inside the body a bright scalp molding 54 clampingly engages a rear inside leg of the H-shaped frame member 20 and extends longitudinally forwardly obscuring the rear arm 42 of the sealing member. As with the trough 46, the molding 54 is also adapted to carry away any water that leaks past the arm 42 and the inboard flange 50. Consequently, additional ensurance is provided against leakage to the interior of the vehicle body.

With this type weather strip in the structure described, it can be seen that with the windows closed an effective double seal is provided with added desirable feature of employing the trough 46 and the molding 54 for carrying away leakage. Further, the weather strip 32 of this invention has a sturdy enlarged outside arm that will re-adjust easily for misalignments between the coacting window frame members and is sufficiently strong to provide the desired durability necessary for repeated opening and closing movements of either the doors or the windows.

I claim:

1. In combination, adjacent closure members independently swingable to and from closed positions, one of the closure members having extending substantially parallel flanges defining a channel adjacent to the other of the closure members, and a weather sealing member of resilient and deformable material in sealing engagement with said other of the closure members for movement therewith, the sealing member having spaced apart projecting lips each provided with a convex sealing surface arranged to engage one of the flanges when the closure members are in the closed positions so as to be deformed thereby and have a substantially greater area of each in engagement therewith, the weather sealing member lips combining with the flanges and the channel defined thereby to provide a drain trough when the closure members are in the closed positions.

2. In combination, adjacent closure members independently movable to and from closed positions, one of the closure members having extending flanges defining a drain channel adjacent to the other of the closure members, each of the flanges being provided with arcuate shoulders, and a weather sealing member of resilient and deformable material secured in sealing relation with the other of the closure members for movement therewith, the weather sealing member having projecting lips provided with convex sealing surfaces, each of the sealing surfaces being engageable with one of the flange arcuate shoulders on the same side of the flanges when the closure members are in the closed positions so as to be deformed thereby and have a substantially greater area of each in sealing engagement therewith.

3. In combination, adjacent closure members independently swingable to and from closed positions, one of the closure members having a long extending outboard flange and a short extending inboard flange, the flanges being substantially parallel so as to define a channel therebetween adjacent to the other of the closure members, each of the flanges having arcuate shoulders, and a weather sealing member of resilient and deformable material secured in sealing relation with the other of the closure members for movement therewith, the sealing member having a long projecting inboard lip and a short projecting outboard lip so arranged relative to each other as to define a drainage trough therebetween, each of the lips being provided with a convex sealing surface, the long inboard lip sealing surface engaging the arcuate shoulder of the short inboard flange and the short outboard lip sealing surface engaging the arcuate shoulder of the long outboard flange when the closure members are in the closed position so as to be deformed thereby and have a substantially greater area thereof in sealing engagement therewith, the sealing member drainage trough and the flange channel combining when the closure members are in the closed position to carry away leakage fluid, the short inboard flange and the short outboard lip of the sealing member being of predetermined lengths so as to avoid interfering with each other when the closure members swing to and from the closed positions.

4. In combination, adjacent closure members independently swingable to and from closed positions, one of the closure members having a long extending outboard flange and a short extending inboard flange, the flanges being substantially parallel so as to define a channel therebetween adjacent to the other of the closure members, each of the flanges having arcuate shoulders, and a weather sealing member of resilient and deformable material secured in sealing relation with the other of the closure members for movement therewith, the sealing member having a long projecting inboard lip and a short projecting outboard lip so arranged relative to each other as to define a drainage trough therebetween, and each of the lips being provided with a convex sealing surface, the long inboard lip sealing surface engaging the arcuate shoulder of the short inboard flange on the inboard side thereof and the short outboard lip sealing surface engaging the arcuate shoulder of the long outboard flange on the inboard side thereof when the closure members are in the closed position so as to be deformed thereby and have a substantially greater area thereof in sealing engagement therewith, the short inboard flange and the short outboard lip of the sealing member being of predetermined lengths so as to avoid interfering with each other when the closure members swing to and from the closed positions, the long projecting inboard lip of the sealing member being of relatively thin and pliable structure with the end thereof biased inboard so as to be capable of free movement past the outboard side of the short inboard flange.

5. In combination, adjacent closure members independently swingable to and from closed positions, one of the closure members being provided with a frame member having a long extending outboard flange and a short extending inboard flange, the flanges being substantially parallel so as to define a channel therebetween adjacent to the other of the closure members, each of the flanges having arcuate shoulders, and a weather sealing member of resilient and deformable material secured in sealing relation with the other of the closure members for movement therewith, the sealing member having a long projecting inboard lip and a short projecting outboard lip so arranged relative to each other as to define a drainage trough therebetween, each of the lips being provided with a convex sealing surface, the long inboard lip sealing surface engaging the arcuate shoulder of the short inboard flange and the short outboard lip sealing surface engaging the arcuate shoulder of the long outboard flange when the closure members are in the closed position so as to be deformed thereby and have a substantially greater area thereof in sealing engagement therewith, the sealing member drainage trough and the flange channel combining when the closure members are in the closed position to carry away leakage fluid, the short inboard flange of the frame member and the short outboard lip of the sealing member being of predetermined lengths so as to avoid interfering with each other when the closure members swing to and from the closed positions, the long projecting inboard lip of the sealing member being of relatively thin and pliable structure with the end thereof biased inboard when unstressed and the short projecting outboard lip being of relatively thick structure so that each lip structure compensates for misalignments between the closure members in the closed positions thereof.

References Cited in the file of this patent

UNITED STATES PATENTS

| 1,927,423 | Stevens et al. | Sept. 19, 1933 |
| 1,949,193 | Verhagen | Feb. 27, 1934 |
| 2,358,143 | Castor | Sept. 12, 1944 |
| 2,474,985 | Rivard et al. | July 5, 1949 |
| 2,611,937 | Kendrick | Sept. 30, 1952 |

FOREIGN PATENTS

| 725,374 | Germany | Sept. 21, 1942 |
| 675,687 | Great Britain | July 16, 1952 |